United States Patent [19]

Williams

[11] Patent Number: 5,450,483
[45] Date of Patent: Sep. 12, 1995

[54] METHOD OF CONTROLLING OVERLOADS IN A TELECOMMUNICATIONS NETWORK

[75] Inventor: Philip M. Williams, Suffolk, England

[73] Assignee: British Telecommunications p.l.c., London, England

[21] Appl. No.: 202,930

[22] Filed: Feb. 28, 1994

[30] Foreign Application Priority Data

Nov. 18, 1993 [EP] European Pat. Off. ............ 93309185

[51] Int. Cl.⁶ ............................................ H04M 3/36
[52] U.S. Cl. .................... 379/279; 379/221; 379/269; 379/112
[58] Field of Search .............. 379/221, 269, 279, 112, 379/203, 134

[56] References Cited

U.S. PATENT DOCUMENTS

| | | | |
|---|---|---|---|
| 4,284,852 | 8/1981 | Szybicki et al. | 379/221 |
| 4,455,455 | 6/1984 | Little | 379/203 |
| 4,704,724 | 11/1987 | Krishnan et al. | 379/221 |
| 4,756,019 | 7/1988 | Szybicki | 379/112 |
| 4,788,721 | 11/1988 | Krishnan et al. | 379/221 |
| 4,979,118 | 12/1990 | Kheradpir | 364/436 |
| 5,060,258 | 10/1991 | Turner | 379/134 |
| 5,068,892 | 11/1991 | Livanos | 379/221 |
| 5,295,183 | 3/1994 | Langlois et al. | 379/221 |

FOREIGN PATENT DOCUMENTS

| | | | |
|---|---|---|---|
| 0490446 | 6/1992 | European Pat. Off. | H04Q 3/00 |
| 0496061 | 7/1992 | European Pat. Off. | H04Q 3/66 |

OTHER PUBLICATIONS

Crabtree et al, "Advanced Information Processing in Traffic Management", Br. Telecom Technol. J., vol. 9, No. 3, pp. 34-42, 3 Jul. 1991.
Tokunaga et al, "Traffic Congestion Control Based on Call Density Control", Electronics & Communications in Japan, part 1—Communications, vol. 72, No. 5, May 1989, New York, US, pp. 96-107.
Ackerley, "Overall Grade-of-Service Models for the British Telecom Network", Twelfth International Teletraffic Congress, ITC-12, vol. 1, 1 Jun. 1988, Torino, IT, pp. 16-27.
Haenschke et al, "Network Management and Congestion in the U.S. Telecommunications Network", IEEE Transactions on Communications, COM-29, No. 4, 4 Apr. 1981, New York, US, pp. 376-385.
Passeron, "Network Supervision and Management", Commutation et Transmission, vol. 13, no. Spec. 1991, Paris, FR, pp. 45-52.

(List continued on next page.)

Primary Examiner—James L. Dwyer
Assistant Examiner—Scott Wolinsky
Attorney, Agent, or Firm—Nixon & Vanderhye

[57] ABSTRACT

In a method of controlling overloads in a telecommunications network, a module 46 for detecting and monitoring overloads is provided at a node 40. The node 40 includes a module 44 for controlling access to terminal resources such as telephones and fax machines. The module 44 also detects failed calls. Upon detecting an initial failed call to a particular called party number, a counter in module 46 is initialized. The counter is incremented for each further failed call to the particular called party number and also decremented at a fixed rate. When the number of calls in the counter rises above a first threshold, the counter goes into an overload state. When the number of calls in the counter falls below a second threshold, the counter goes into a no overload state. The module 46 sends an indication of the state of the counter and the identity of the called number to a module 48 in a node 41 which sets and updates a restriction parameter. The node 41 is upstream from the node 40 in the direction of call set up and the overload status is transmitted in the backward call set up messages. The module 48 then sets the restriction parameter in accordance with the overload status of calls to the called number and supplies this parameter to a module 49 which restricts calls to the called number. Call restriction is maintained until the overload to the called number subsides completely. The invention may also be used to detect and control calls whose call identities belong to a common set of call identities.

9 Claims, 6 Drawing Sheets

OTHER PUBLICATIONS

Stach, "Graph Analysis and Rule Based Paradigms for the Identification, Containment and Clearing of Switch Congestion in Non-Hierarchical Circuit Switched Networks", Proceedings of the National Communications Forum 43, (1989) Oct. 2/4, No. 1, Chicago, pp. 474-482.

Turner et al, "A new Call Gapping Algorithm for Network Traffic Management", Proceedings of the 13th International Teletraffic Congress ITC-13; 19 Jun. 1991, Copenhagnen, pp. 121-126.

Stacey et al, "Dynamic Alternative Routing in the British Telecom Trunk Network", International Switching Symposium, vol. 4, 15 Mar. 1987, Phoenix, pp. 984-988.

Wolf, "Advanced Techniques for Managing Telecommunications Networks", IEEE Communications Magazine, vol. 28, No. 10, Oct. 1990, New York, pp. 76-81.

Chemouil et al, "Integrated Network Management and Control", Computer Networks and ISDN Systems, vol. 20, No. 1/5, Dec. 1990, Amsterdam, pp. 143-153.

Pham, "Control Loop for Traffic Management of Network Under Focussed Overloads", Proceedings of the 13th International Teletraffic Congress ITC-13, 19 Jun. 1991, Copenhagen, pp. 315-322.

Langlois et al, "Dynamic Congestion Control in Circuit-Switched Telecommunications Networks", Proceedings of the 13th International Teletraffic Congress ITC-13, 19 Jun. 1991, Copenhagen, pp. 127-132.

Mase et al, "Advanced Traffic Control Methods for Network Management", IEEE Communications Magazine, vol. 28, No. 10, Oct. 1990, New York, pp. 82-88.

Kettler, "Network Management: Surveillance and Control of a Modern Telecommunications Network", IEEE International Conference on Circuits and Computers ICCC80, vol. 2, 1980, pp. 834-837.

Ebner et al, "Network Management", Bell System Technicla Journal, vol. 62, No. 7, Sep. 1983, New York, US, pp. 2239-2260.

Gifford, "Adaptive Routing and Traffic Control in Damaged Circuit Switched Networks", IEEE Military Communications Conference, Conference Record Session 1.2, vol. 1/3, 19 Oct. 1987, pp. 7-12.

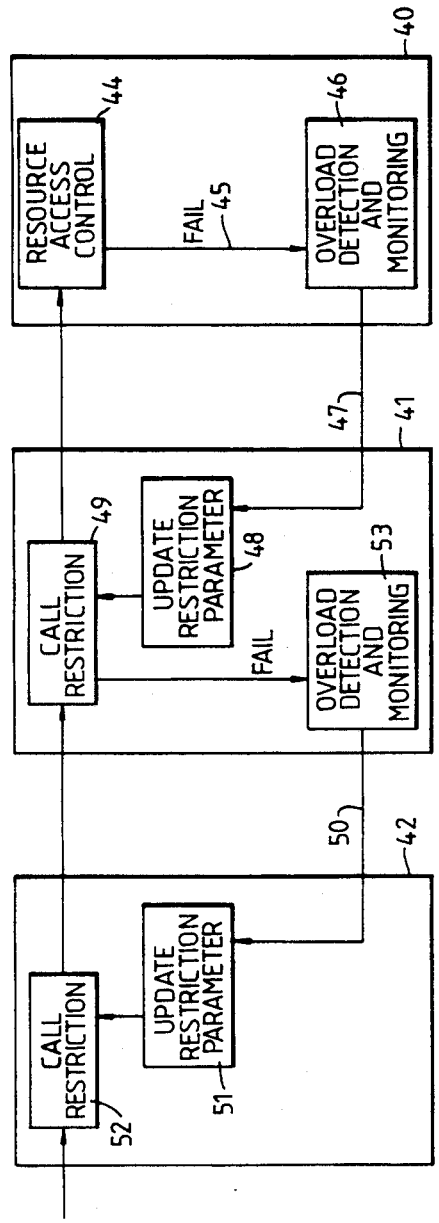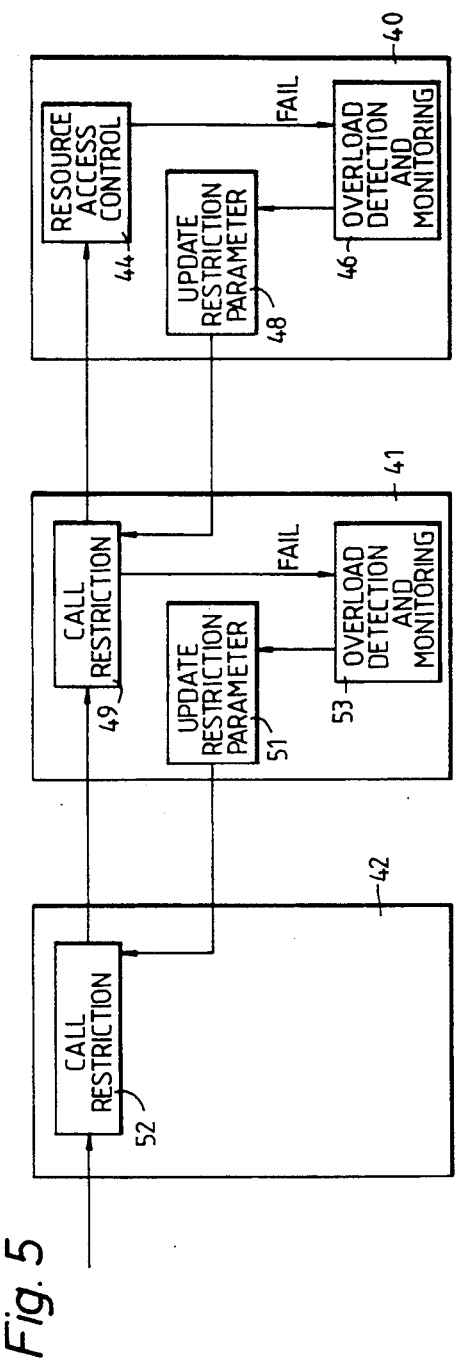
Fig. 4
Fig. 5

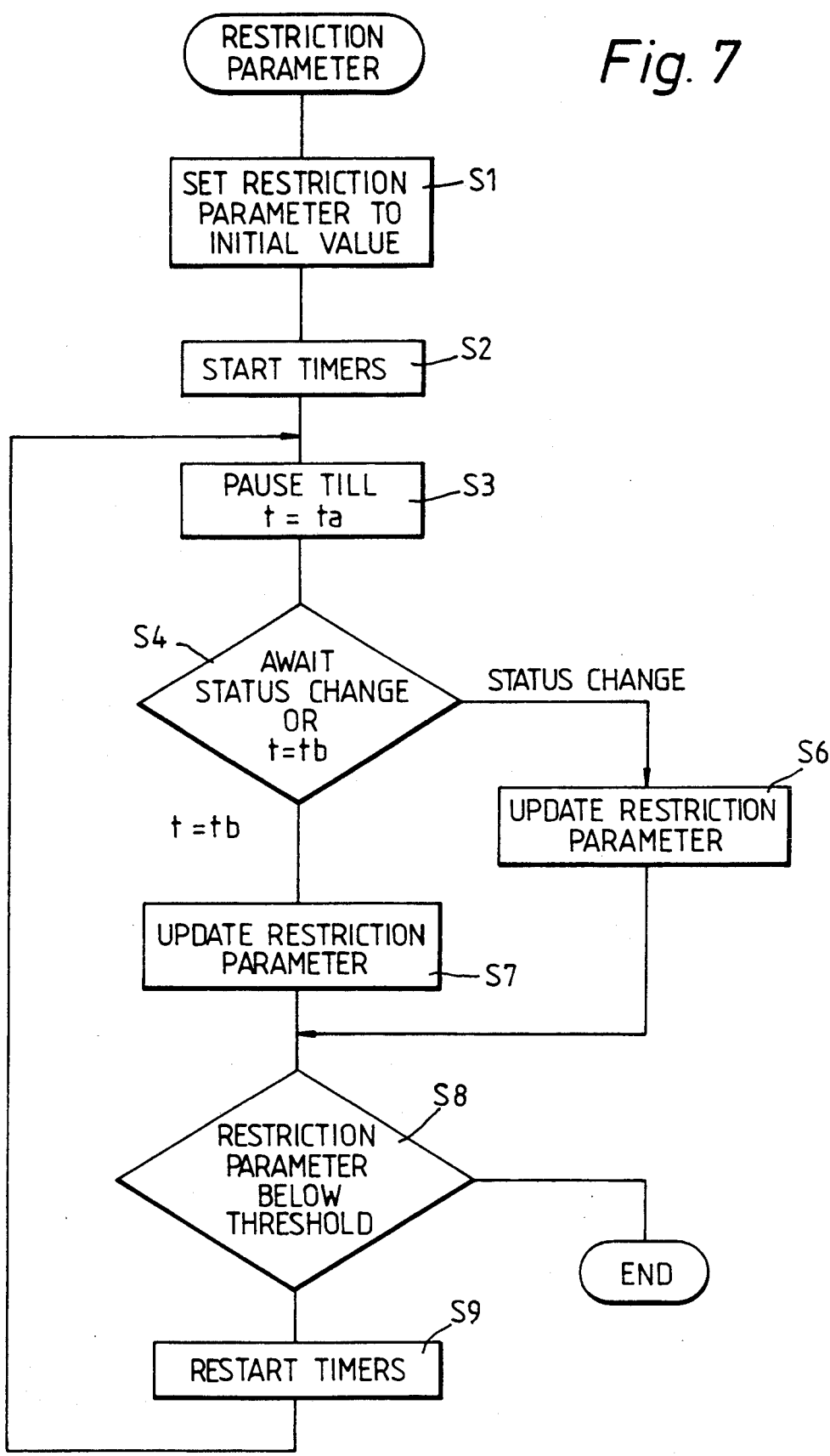

METHOD OF CONTROLLING OVERLOADS IN A TELECOMMUNICATIONS NETWORK

This application is related to copending commonly assigned application Ser. No. 08/115,689, filed Sep. 3, 1993.

BACKGROUND OF THE INVENTION

1. Field of the Invention

This invention relates to a method of controlling overloads in a telecommunications network.

2. Discussion of Prior Art

An overload in a telecommunications network may arise for various reasons. For example, a television program requesting telephone calls from its audience may cause an overload. An overload may also occur when a large number of people attempt to make calls to an entertainment or an information service or to a business which has something special on offer. It is clearly desirable to control such overloads.

SUMMARY OF THE INVENTION

According to this invention, there is provided a method of controlling overloads in a telecommunications network comprising a network of interconnected nodes arranged to provide connection between terminal resources, said method comprising the steps of: upon detecting an initial failed call setting a counter to an initial value; incrementing the counter upon detecting each further failed call whose call identity is the same as that of the initial failed call or whose call identity belongs to a common set of call identities which includes the call identity of said initial failed call; decrementing said counter at a predetermined rate; causing said counter to provide an output which is in a first state when the number of calls in the counter rises above a first threshold and which is in a second state when the number of calls in the counter falls below a second threshold; setting and updating a restriction parameter in accordance with the output of the counter; and restricting calls having said common call identity or whose call identities belong to said common set of call identities, the level of restriction applied in said step of restricting calls being determined by the value of said restriction parameter.

Preferably, in said step of setting and updating the restriction parameter, after each updating of the restriction parameter, during a first time period the restriction parameter is not updated, during a second time period the restriction parameter is varied so as to increase the severity of the level of restriction if the output of the counter changes from the second state to the first state or so as to decrease the severity of the level of restriction if the output of the counter changes from the first state to the second state, and if the second time period expires without a change in state of the output of the counter, the restriction parameter is varied so as to increase the level of restriction if the output of the counter is in the first state or so as to decrease the level of restriction if the output of the counter is in the second state.

Conveniently, said initial failed call and said further failed calls are detected at a first one of said nodes, and said step of restricting calls is performed at one or more nodes which are upstream from said first node with respect to the direction of call set up.

BRIEF DESCRIPTION OF THE DRAWINGS

This invention will now be described in more detail, by way of example, with reference to the accompanying drawings in which:

FIG. 4 is a block diagram showing processes which are added to a telecommunications network to provide a method of controlling overloads embodying this invention;

FIG. 5 shows an alternative location for the processes shown in FIG. 4;

FIG. 7 is a flow chart of an algorithm used for calculating a parameter used in call restriction.

DETAILED DISCUSSION OF PREFERRED EMBODIMENTS

Figure 1:
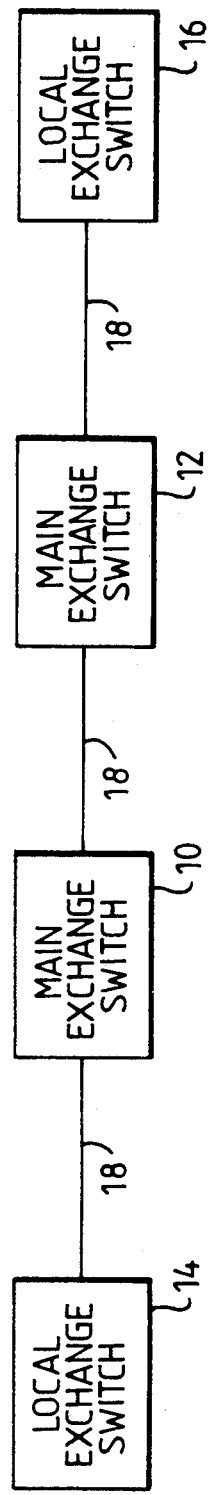
FIG. 1 is a block diagram showing some of the switches which form a public telecommunications network.

Referring now to FIG. 1, there is shown some of the switches used in a public telecommunications network. The switches shown in FIG. 1 comprise two trunk exchange switches 10, 12 and two local exchange switches 14, 16. The trunk exchange switches 10, 12 are just two switches of a fully interconnected network of trunk exchange switches located over a large geographical territory, such as the UK. The local exchange switches 14, 16 are part of a much larger number of local exchange switches which provide access to terminal resources, most of which are telephones or facsimile machines or integrated services digital network (ISDN) terminals. Each local exchange switch may be connected to one, two or three trunk exchange switches. The switches of the telecommunications network are connected by routes 18 which are embodied by suitable traffic carriers such as coaxial copper cables, optical fibre cables and microwave links. The traffic takes the form of voice and other data and also the signalling messages which are used for setting up calls. As well known, signalling messages include forward call set up messages which travel in the direction of call set up and backward call set up messages which travel in the reverse direction.

Figure 2:
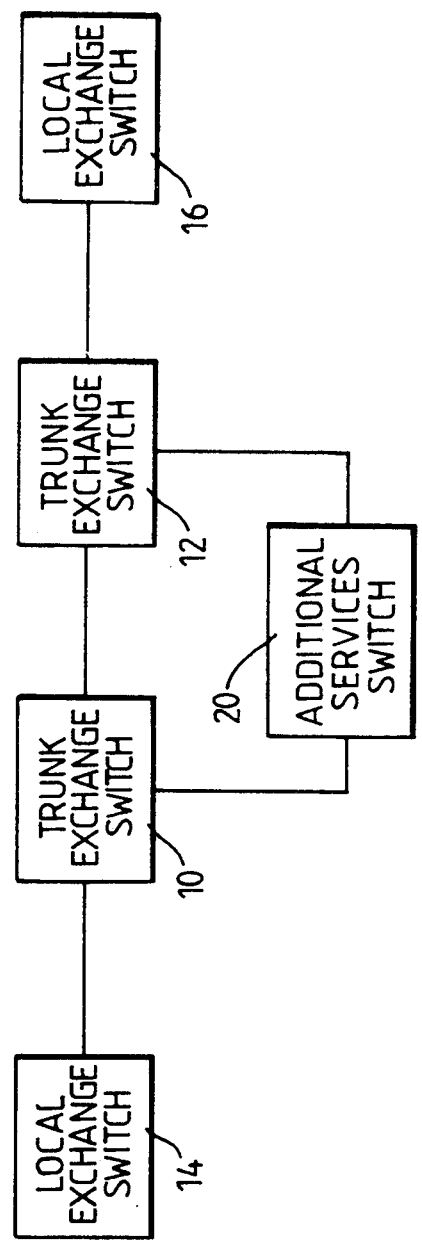
FIG. 2 shows a modification to the public telecommunications network of FIG. 1 which includes an additional switch for providing additional services.

FIG. 2 shows the addition of a switch 20 for providing additional services to the telecommunications network of FIG. 1. The switch 20 is connected to the trunk exchange switches. The additional services may include information and entertainment services and also the facility for callers to make free calls or calls charged at the local rate to business numbers. For example, in BT's public telecommunications network in the UK, telephone codes which commence with "0891" and "0898" relate to entertainment and information services. Codes to business numbers which are free to the caller or charged at the local call rate commence, respectively, with "0800" and "0345".

Figure 3:
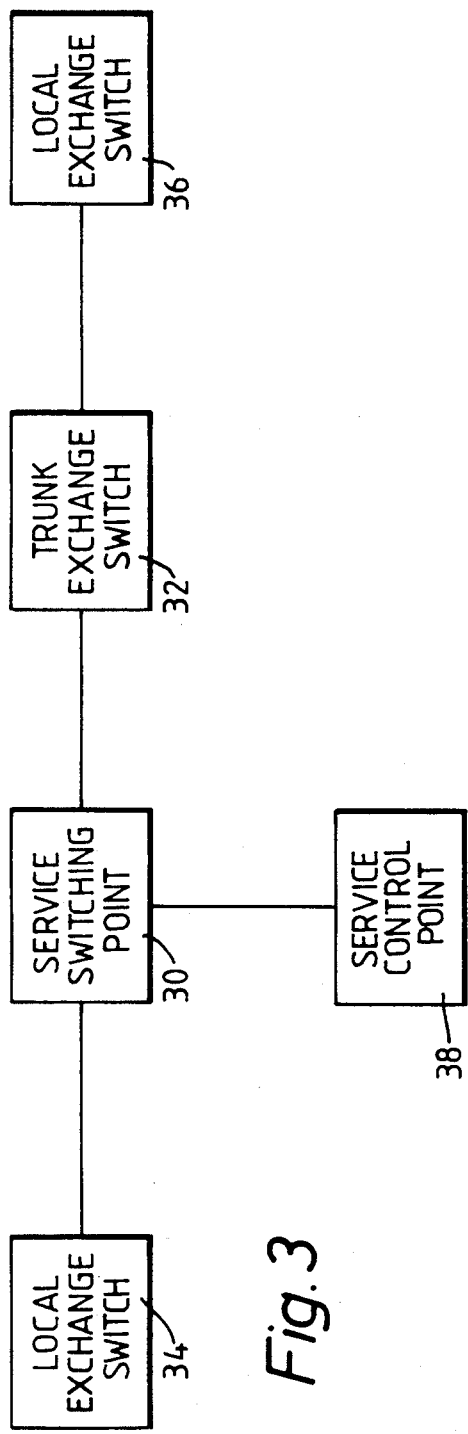
FIG. 3 is a block diagram showing some of the switches which form an intelligent telecommunications network.

FIG. 3 shows some of the switches which form an intelligent network. The switches include a service switching point 30, a trunk exchange switch 32, two local exchange switches 34, 36, and a service control point 38. The service control point 30 and the trunk exchange switch 32 are part of a network of interconnected service switching points and trunk exchange switches, and the local exchange switches 34, 36 are part of a much larger number of local exchange switches. Each service switching point is connected to the service control point 38. In addition to providing access to the service control point 38, each service switching point also provides the function of a trunk exchange switch. A service switching point can also provide the function of a local exchange switch. The service switching points together with the service control point 38 provide the network with intelligent services. One example of an intelligent service is number translation, which takes place in the service control point.

The trunk switches 10, 12 and the local exchanges switches 14, 16 of FIG. 1, the additional services switch 20 of FIG. 2, the switches 32, 34 and 36 and also the service switching point 30 and the service control point 38 of FIG. 3 are all examples of network nodes. In this specification the term "node" should be construed as any point in a network which is used in setting up a call.

The three networks shown in FIGS. 1, 2 and 3 represent three examples of telephone networks in which the present invention may be implemented. However, implementation of the present invention is not limited to these three types of network and a mobile telecommunications network represents a further example of networks in which the invention can be implemented.

FIG. 4 shows an example of the additional processes which are provided at nodes 40, 41 and 42 of a telecommunications network in order to control overloads in accordance with this invention. In the example shown in FIG. 4, the node 40 is an exchange switch which has direct access to terminal resources while the nodes 41 and 42 are upstream from node 40 with reference the direction of call set up. Thus, the nodes 40, 41 and 42 of FIG. 4 may correspond to the exchange switches 16, 12 and 10 shown in FIG. 1, or the exchange switches 16, 12 and the additional services switch 20 shown in FIG. 2. In the case of the intelligent network of FIG. 3, the node 40 could be the local exchange switch 36, the node 41 could be the trunk exchange switch 32 and the node 42 could be the service switching point 30. The processes for overload control are implemented by modifying the software which controls the nodes. These modifications will now be described in general terms for the nodes 40, 41 and 42.

The software of the node 40 includes a resource access control module 44 which controls access to terminal resources. The module 44 is of conventional design but modified to provide an output signal 45 in the event of call failure. The output signal 45 gives the call identity of a failed call. The normal criterion for registering a call as a failed call is that the terminal instrument is engaged or unobtainable However, if desired, other criteria may be used. For example, an excessive delay in setting up a call could also be classified as a failure.

The signal 45 indicating call failure is supplied to an overload detection and monitoring module 46. The module 46 provides an output signal 47. The module 46 may be arranged simply to detect overloads to individual full length called numbers. As will be explained in more detail below, the module 46 may also be arranged to detect overloads falling within a common set of call identities. A set of call identities may comprise a number of full length called party numbers, or a number of full length calling party numbers, or all the numbers of a particular service such as the "0800" service mentioned above, or even all the called party numbers accessed by an exchange switch. The data in signal 47 comprises an indication of overload and the call identity or the set of call identities causing the overload. The indication of overload can have only two states, namely, overload and no overload. The signal 47 forms part of the backward call set up message. Where the overload is caused by calls to a single full length called party number, the backward call set up message already contains the call identity. Consequently, the only modification to the conventional backward call set up message is the addition of an extra bit of data which has a value of binary "1" for an overload and a value of binary "0" where there is no overload. Where the overload relates to a set of call identities, the backward set up message must be modified to specify the set of call identities.

In the module 41, the signal 47 is supplied to a software module 48 for setting and updating the restriction parameter. The restriction parameter specifies the level of call restriction which is to be applied in the node 41 to calls destined for node 40. There are various methods of applying call restriction. In the present example, call restriction is applied by proportional blocking. Thus, the restriction parameter specifies the proportion of calls which are blocked and consequently the level of restriction increases with the value of the restriction parameter. Alternatively, the restriction parameter could specify the proportion of calls which are allowed with the result that the level of restriction would increase as the value of the restriction parameter falls. Another method of applying call restriction is call gapping in which each call is followed by a gap interval during which all calls are blocked.

The restriction parameter is supplied by the module 48 to a module 49 which applies call restriction. The module 49 also identifies failed calls and supplies the call identities of the failed calls to an overload detection and monitoring module 53, which is identical to the module 46. In the module 41, a call is identified as a failed call if it is blocked because of call restriction or if it fails due to a cause occurring at node 41 or a cause such as no circuits available occurring between nodes 41 and 40. If the call fails at node 40, it is not identified as a failed call in module 49 because such a call will be identified as a failed call in the module 44.

The module 53 supplies an output signal 50 indicating overload or no overload to a software module 51 located in node 42. The module 51 sets and updates the restriction parameter for controlling the level of restriction to be applied by node 42 to calls destined for node 41. The restriction parameter is supplied to a module 52 which implements call restriction. The module 51 is identical to the module 48 and the module 52 is identical to the module 49 except that the module 52 does not detect failed calls.

As will be explained in more detail below, the module 48 progressively increases the restriction parameter when the output signal from the module 46 indicates the presence of an overload, thereby increasing the proportion of calls which are blocked, and progressively decreases the restriction parameter when the output signal from the module 46 indicates there is no overload, thereby decreasing the proportion of calls which are blocked. Consequently, the node 40 oscillates in and out of an overload state until the cause of the overload subsides. As a result, the rate at which the node 41 sends call set up messages to the node 40 should be close to the rate at which calls can be completed successfully. By preventing calls which have a low chance of success from reaching node 40, there is removed the risk that such calls will interfere with other calls which have a high chance of success.

The module 51 operates in a similar manner to the module 48. Consequently, if there is an overload at node 41, the process of increasing and decreasing the restriction parameter in module 51 will ensure that the node 41 oscillates into and out of an overload state. However, in most telecommunications networks, the node 41 will be only one of several nodes which are sending call set up messages to the node 40 for calls having the call identity or falling within the set of call identities which are causing the overload. Where the overall proportion of failed and blocked calls is comparatively modest, the node 41 will not be in an overload condition. Where the proportion of failed and blocked calls is severe, the node 41 will also be in an overload condition and so call restriction will also be applied at node 42. Thus, with increasing severity of the overload condition, call restriction is applied progressively further away from node 40.

Because the software modules for controlling overload in node 41 and the other nodes which send call set up messages to the node 40 are the same, the level of call restriction applied in the various nodes in the event of overload will be similar. However, because the signal from the module 46 indicating overload is transmitted in the backward call set up message and not continuously, there will be some variation in the level of restriction. Similarly, the level of restriction applied in the nodes which send set up messages to the node 41 will be similar but not identical.

Referring now to FIG. 5, there is shown a modification to the arrangement of FIG. 4 in which the modules 48 and 51 for setting and updating the restriction parameters are located at the nodes 40 and 41 rather than at the nodes 41 and 42. Consequently, the level of restriction in all of the nodes which send call set up messages to the node 40 will be identical. Likewise, the level of restriction in all of the nodes which send call set up messages to node 41 will be identical. Thus, with proportional blocking this arrangement provides total fairness for the callers. However, this arrangement has the disadvantage that the backward call set up messages have to specify the value of the restriction parameter and this requires more bits of data than that required simply to specify the presence or absence of an overload.

FIGS. 4 and 5 each show an arrangement in which call restriction is applied at two nodes along a call set up path. If it is desired to apply call restriction at only one node along the path, this may be achieved by omitting the overload control arrangement of node 40 as shown in FIG. 4 or FIG. 5. On the other hand, if it is desired to apply restriction at more than two places along the call set up path, this may be achieved by repeating the overload control arrangement of node 41 as shown in FIG. 4 or FIG. 5 as many times as desired.

FIG. 4 and FIG. 5 each show an arrangement in which the overload is detected initially at the node which accesses the terminal resources and this usually represents the most desirable point to do this. However, if desired, the initial detection may occur at an upstream position with regard to call set up. For example, the nodes 40, 41 and 42 of FIG. 4 could correspond to the switches 12, 10 and 14 of FIG. 1, or the switches 20, 10 and 14 of FIG. 2 or the service control point 38, the service switching point 30 and the local exchange switch 34 of FIG. 3.

By way of modification, call restriction may be applied at the node where the overload is detected. For example, in the intelligent network of FIG. 3, overload detection and call restriction may both occur at the service switching point 38.

There will now be described the two algorithms which are used, respectively, for detecting and monitoring the overload and for setting and updating the restriction parameter. These will be described initially with respect to detecting and controlling an overload to a full length called party number.

Figure 6:
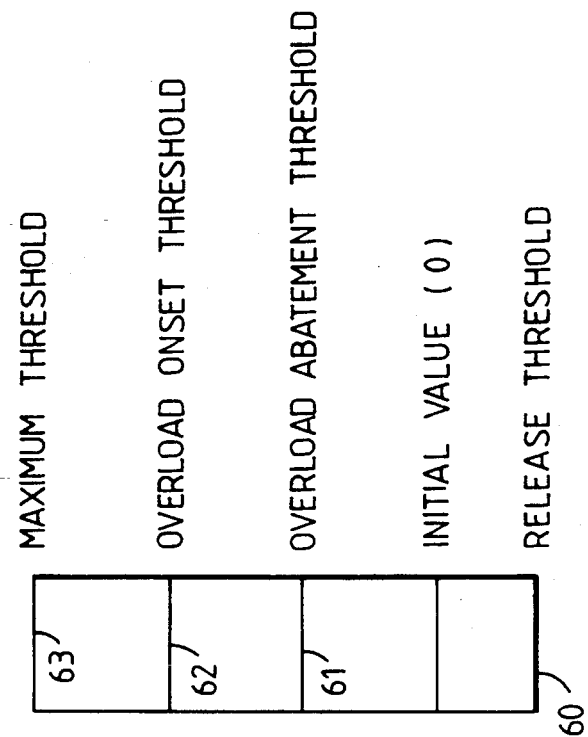
FIG. 6 shows the thresholds used in a counter which itself is used for detecting and monitoring an overload.
Figure 8:
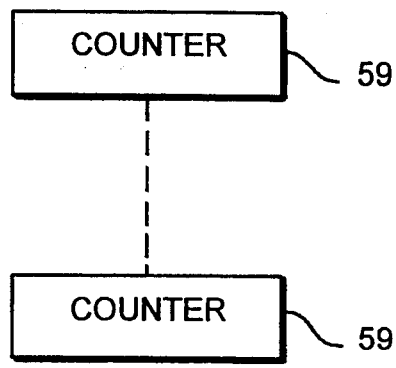
FIG. 8 shows a set of counters used for detecting and monitoring overload.
Figure 9:
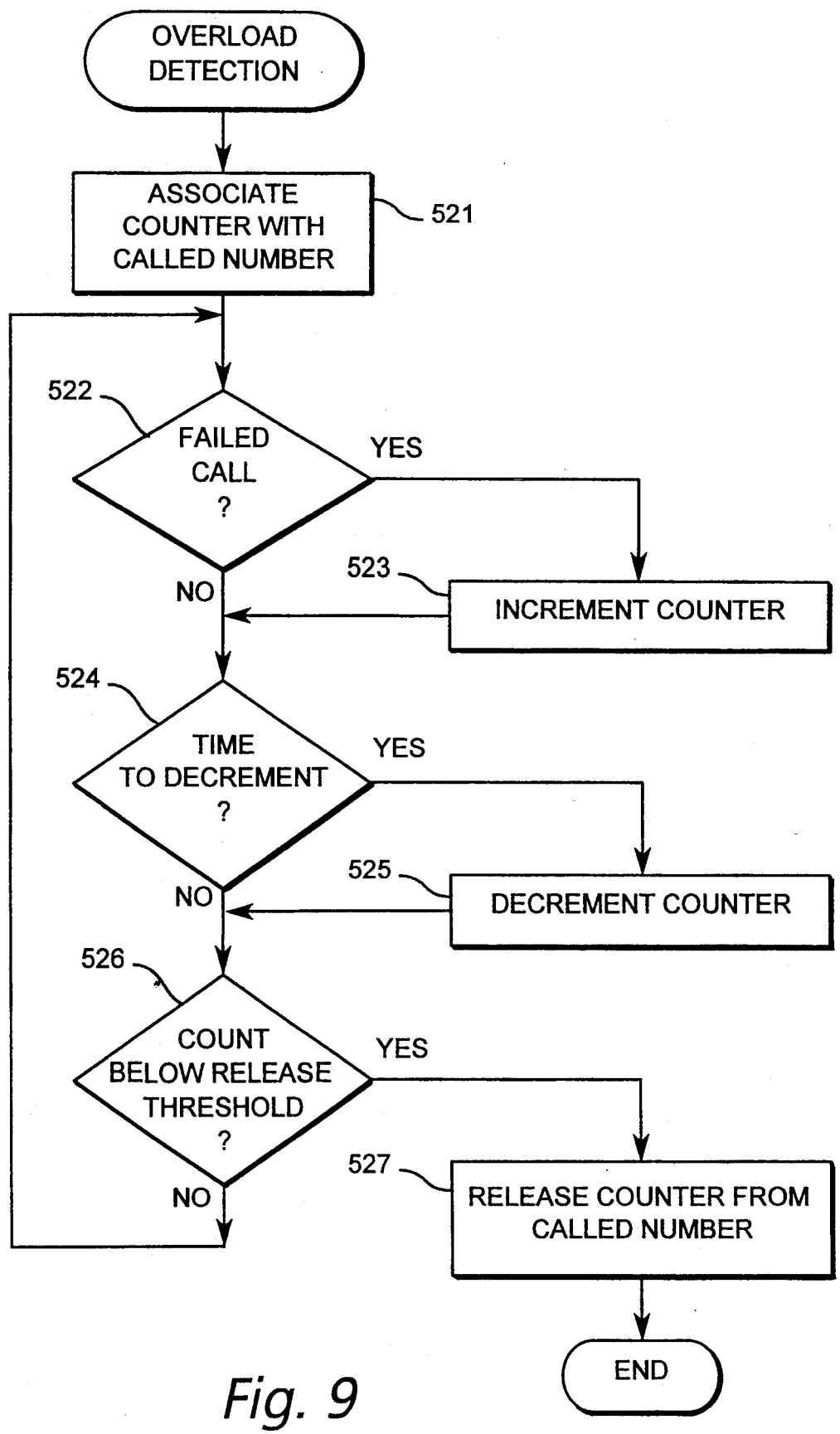
FIG. 9 is a flow chart of an algorithm used for detecting and monitoring an overload.

The algorithm for detecting and monitoring overloads uses a set of counters. As illustrated in FIG. 6, each of these counters has an initial value, which is normally 0, and four thresholds, namely, a release threshold 60, an overload abatement threshold 61, an overload onset threshold 62 and a maximum threshold 63. As illustrated in FIG. 9, when an initial call failure to a full length called party number is detected, one of the counters 59 (in FIG. 8) is associated with that number and set to its initial value (step S21). In a step S22, a check is made to determine if a further failed call has been detected to the number. Each time a failed call is detected to the number, the counter is incremented by one (step S23). The counter is also decremented at a constant rate. Step S24 checks to determine if the counter should be decremented and step S25 decrements the counter if necessary. If the count rises above the overload onset threshold, the counter goes into its overload state. The counter is prevented from counting above its maximum threshold. When the value of the count falls below the overload abatement threshold, the counter goes into its no overload state. When the count falls below the release threshold, the counter is no longer associated with the called party number. In step S26, a check is made to determine whether the count has fallen below the release threshold and, if so, in step S27, the counter is released from the called party number.

By providing separate onset and abatement thresholds, the counter has hysteresis. These thresholds should be set close enough so that the overload is detected with sufficient precision but far enough apart to give adequate hysteresis. The overload onset threshold should be set high enough to prevent the counter from going into the overload state when calls are failing for innocuous reasons but it should be set low enough to provide sensitivity to genuine overloads. The maximum threshold should not be set so high that there is an undue delay in reducing the level of call restriction after a sudden surge in calling rate.

Each of the software modules which sets and updates the restriction parameter contains a number of copies of the algorithm for doing this. A flow chart for this algorithm is shown in FIG. 7. When one of these modules receives an indication of overload, it associates one of the copies of the software algorithm with the called party number which is suffering the overload. Then, and referring to FIG. 7, in a step S1, the restriction parameter is set to an initial value. Consequently, call restriction, which in the present example is achieved by proportional blocking, commences at a level specified by this initial value.

Then, in a step S2, two timers are started for timing intervals $t_a$, $t_b$. Then, the algorithm enters and remains in a step S3 until the elapsed time t is equal to the preset value $t_a$. Thus, during the time interval which ends when the elapsed time is $t_a$, no change is made to the restriction parameter.

The algorithm then enters a step S4 in which the overload status is monitored and the elapsed time is compared with the second preset value $t_b$. If a change in the overload status occurs when the elapsed time is between $t_a$ and $t_b$, the restriction parameter is updated in a step S6. In the step S6, the restriction parameter is increased if the overload status has changed from no overload to overload and it is decreased if the overload status has changed from overload to no overload. After step S6, the algorithm passes to a step S8 which is described below.

If the overload status does not changes in the interval when the elapsed time is between $t_a$ and $t_b$, the restriction parameter is updated in a step S7. In step S7, the restriction parameter is increased if there is an overload and it is decreased if there is no overload. After step S7, the algorithm continues with step S8.

When the restriction parameter is increased, the new value $b_n$ is calculated from the old value $b_{n-1}$ by the following equation:

$$b_n = (1-\alpha) + \alpha \cdot b_{n-1} \quad (1)$$

In equation (1), the constant $\alpha$ will usually be chosen close to a value of 1.

When the restriction parameter is decreased, the new value $b_n$ is calculated from the old value $B_{n-1}$ by the following equation:

$$b_n = b_{n-1} - \beta \quad (2)$$

In step S8, the restriction parameter is compared with a threshold which is less than the initial value of the restriction parameter. If its value is below the value of this threshold, call restriction ceases and the algorithm is no longer associated with the full length called party number. If the restriction parameter is above this threshold, the two timers are restarted in a step S9 and the algorithm then returns of step S3.

The algorithms for detecting and monitoring overloads and for setting and updating the restriction parameter have been described above with reference to monitoring and controlling overloads to full length called party numbers. There will now be given an example which shows how these algorithms may be modified for monitoring and controlling calls when arranged by sets of call identities. In the following example, the call identities are the complete group of call identities for called party numbers used in BT's UK public telecommunications network.

In this example, the complete group of called party identities is arranged as three collections of sets of call identities. Each collection comprises the complete group of call identities arranged either as a single set of call identities or divided into a plurality of non-intersecting sets of call identities. Specifically, the first collection comprises a single set of all the individual call identities. The second collection comprises an individual set for each of the service codes "0345", "0800", "0891" and "0898", and a fifth set for all the remaining call identities. The third collection comprises a single set for the two full length call party numbers "0891 000000" and "0891 000001", and an individual set for each of the remaining full length called party numbers. In this example, the two number "0891 000000" and "0891 000001" are two numbers used for television voting. The first number is the one used for a yes vote and the second number is the one for a no vote. These two numbers are put together in a single set as it is clearly essential for exactly the same level of call restriction to be applied to each of these numbers.

In each copy of the module for detecting and monitoring overload, a number of counters is dedicated to each collection. Specifically, a single counter is dedicated to the first collection, four counters are dedicated to the second collection, and three counters are dedicated to the third collection. Thus, the sets of each collection and the number of counters dedicated to each collection is as shown in the following table.

| Sets in Collection | Number of Counters for collection |
| --- | --- |
| Single set consisting of all called party numbers | 1 |
| 0345, 0800, 0891, 0898, remainder | 4 |
| Each full length number and (0891 000000 + 0891 000001) | 3 |

As may be observed from the table, the single set in the first collection is divided into five sets in the second collection, and each set in the second collection is divided into a large number of sets in the third collection. For example, the set in the second collection for the "0345" service code is divided in the third collection into a large number of sets, each of which comprises a full length called party number which commences with "0345".

Not all of the sets of call identities are monitored. In the present example, the set in the second collection comprising the remaining full length call party number is not monitored.

With the call identities arranged in sets as set out in the table above, each module for detecting and monitoring overload operates as follows. When a call arrives and fails at the node in which the module is located, an indication of the call identity of the failed call is sent to the module. In each collection of sets of call identities, the call identity for the failed call will belong to a unique set of call identities. The action taken will then depend upon the state of that set. If the set is one that is not monitored, which is the case for the set containing the remaining called party numbers in the second collection, no action is taken. If a counter is already associated with the set containing the call identity for the failed call, then that counter is incremented. If no counter is presently associated with a set containing the call identity of the failed call, and there is a free counter, then the free counter is associated with that set and set to its initial value.

In each module for detecting and monitoring an overload, an indication of overload status is sent to the appropriate module or modules for setting and updating the restriction parameter in the following manner.

When a counter initially passes into the overload state, if no other counter is active or no active counter has made the initial transition into the overload state, an indication is sent to the module or modules for setting and updating the restriction parameter. This indication contains the overload status and data to identify the set of call identities which are being monitored. In the or each module for setting and updating the restriction parameter, one of the copies of the algorithm is then associated with the set which is monitored and the algorithm then calculates the restriction parameter in the manner which has been described above.

If a counter makes its initial transition to the overload state at a time when another counter is active and has previously made its initial transition to the overload state, the following procedure is followed. If the two counters are monitoring sets in the same collection, the new counter to go into its overload state sends an indication of its overload status and the details of the set which is being monitored to the module or modules for setting and updating the restriction parameter. The or each module for setting and updating the restriction parameter then associates one of its spare algorithms with the new set and the restriction parameter is calculated in the manner described above. However, if the two counters are monitoring sets in different collections and one monitored set contains the other monitored set, then the overload status is fed back only for the larger monitored set. Thus, for example, if the first counter which goes into an overload state is associated with a full length number in the third collection beginning with the service code "0345", then call restriction will be applied initially just on this full length number. However, if subsequently a counter for the second collection which is associated with the service "0345" goes into an overload state, then overload restriction will be applied to all calls which commence with this service code.

I claim:

1. A method of controlling overloads in a telecommunications network comprising a network of interconnected nodes arranged to provide connection between terminal resources, said method comprising the steps of:

upon detecting an initial failed call setting a counter to an initial value;

incrementing the counter upon detecting each further failed call whose call identity is the same as that of the initial failed call or whose call identity belongs to a common set of call identities which includes the call identity of said initial failed call;

decrementing said counter at a predetermined rate;

causing said counter to provide an output which is in a first state when the number of calls in the counter rises above a first threshold and which is in a second state when the number of calls in the counter falls below a second threshold;

setting and updating a restriction parameter in accordance with the output of the counter; and restricting calls having said common call identity or whose call identities belong to said common set of call identities, the level of restriction applied in said step of restricting calls being determined by the value of said restriction parameter.

2. A method as claimed in claim 1, comprising the further steps of:

upon detecting said initial failed call associating said counter with the call identity of the initial failed call or said common set of call identities which include the call identity of the failed call; and releasing said counter from its association with the call identity of the failed call or said common set of call identities which include the call identity of the failed call when the number of calls in the counter falls below a threshold value which is set less than said initial value.

3. A method as claimed in claim 1, in which, in said step of setting and updating the restriction parameter, after each updating of the restriction parameter, during a first time period the restriction parameter is not updated, during a second time period the restriction parameter is varied so as to increase the severity of the level of restriction if the output of the counter changes from the second state to the first state or so as to decrease the severity of the level of restriction if the output of the counter changes from the second state to the first state, and if the second time period expires without a change in state of the output of the counter, the restriction parameter is varied so as to increase the level of restriction if the output of the counter is in the first state or so as to decrease the level of restriction if the output of the counter is in the second state.

4. A method as claimed in claim 3, in which, in said step of setting and updating the restriction parameter, the restriction parameter is set to an initial value when the output of the counter initially passes into the first state, call restriction being deactivated when the restriction parameter passes through a threshold in the direction of decreasing call severity, said threshold indicating a lower level of call restriction than that of said initial value.

5. A method as claimed in claim 1, comprising the further steps of:

establishing a group of call identities relating to calls handled by said telecommunications network;

dividing said group into at least one collection of non-intersecting sets of call identities, the or each collection comprising at least one set of call identities; and dedicating a respective set of counters to the or each collection of sets of call identities, each set of counters comprising at least one counter.

6. A method as claimed in claim 1, in which said initial failed call and said further failed calls are detected at a first one of said nodes, and said step of restricting calls is performed at one or more nodes which are upstream from said first-node with respect to the direction of call set up.

7. A method as claimed in claim 6, in which backward call set up messages from said first node to said one or more upstream nodes are used to convey information relating to the overload resulting from said failed calls.

8. A method as claimed in claim 7, in which said step of setting and updating said restriction parameter is performed at said one or more upstream nodes.

9. A method as claimed in claim 7, in which said step of setting and updating said restriction parameter is performed at said first node.

* * * * *